United States Patent
Inoue et al.

(10) Patent No.: US 6,506,520 B1
(45) Date of Patent: Jan. 14, 2003

(54) NON-AQUEOUS ELECTROLYTE SECONDARY BATTERY

(75) Inventors: Kaoru Inoue, Osaka (JP); Hiroshi Yoshizawa, Osaka (JP); Hizuru Koshina, Osaka (JP); Harunari Shimamura, Osaka (JP); Yoshiaki Nitta, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/601,273

(22) PCT Filed: Nov. 30, 1999

(86) PCT No.: PCT/JP99/06688

§ 371 (c)(1),
(2), (4) Date: Sep. 21, 2000

(87) PCT Pub. No.: WO00/33402

PCT Pub. Date: Jun. 8, 2000

(30) Foreign Application Priority Data

| Dec. 2, 1998 | (JP) | 10-342889 |
| Dec. 2, 1998 | (JP) | 10-342890 |
| Dec. 2, 1998 | (JP) | 10-342891 |
| Dec. 2, 1998 | (JP) | 10-342892 |
| Dec. 2, 1998 | (JP) | 10-342903 |
| Dec. 2, 1998 | (JP) | 10-342904 |

(51) Int. Cl.[7] ............................................. H01M 10/24
(52) U.S. Cl. ............................. 429/231.95; 429/218.1
(58) Field of Search ........................ 429/231.95, 218.1, 429/229; 252/182.1; 320/128

(56) References Cited

U.S. PATENT DOCUMENTS

| 4,302,518 A | 11/1981 | Goodenough et al. |
| 4,303,748 A | 12/1981 | Armand et al. |
| 4,427,751 A | * 1/1984 | Furukawa et al. ........... 429/206 |
| 5,085,952 A | 2/1992 | North |
| 5,160,712 A | 11/1992 | Thackeray et al. |
| 5,223,353 A | 6/1993 | Ohsawa et al. |
| 5,275,750 A | 1/1994 | Sato et al. |
| 5,296,318 A | 3/1994 | Gozdz et al. |
| 5,460,903 A | 10/1995 | Hubbard et al. |
| 5,589,296 A | 12/1996 | Iwamoto et al. |
| 5,665,265 A | 9/1997 | Gies et al. |
| 5,677,081 A | 10/1997 | Iwamoto et al. |
| 5,770,333 A | 6/1998 | Saito et al. |
| 6,090,505 A | 7/2000 | Shimamura et al. |

FOREIGN PATENT DOCUMENTS

| EP | 0 730 316 | 9/1996 |
| JP | 55-136131 | 10/1980 |
| JP | 63-274058 | 11/1988 |
| JP | 03-37964 | 2/1991 |
| JP | 4-206479 | 7/1992 |
| JP | 04-242890 | 8/1992 |
| JP | 04-249073 | 9/1992 |
| JP | 04-267053 | 9/1992 |
| JP | 05-62712 | 3/1993 |
| JP | 05-310418 | 11/1993 |
| JP | 06-036798 | 2/1994 |
| JP | 6-98473 | 4/1994 |
| JP | 06-103976 | 4/1994 |
| JP | 06-279049 | 10/1994 |
| JP | 7-240201 | 9/1995 |
| JP | 08-250117 | 9/1996 |
| JP | 9-63651 | 3/1997 |
| JP | 09-259857 | 10/1997 |
| JP | 10-3947 | 1/1998 |
| JP | 10-36120 | 2/1998 |
| JP | 10-509683 | 9/1998 |
| JP | 63-276873 | 11/1998 |
| JP | 11-135120 | 5/1999 |
| JP | 11-185753 | 7/1999 |
| WO | 96/10538 | 4/1996 |
| WO | 98/07729 | 2/1998 |

OTHER PUBLICATIONS

International Search Report corresponding to application No. PCT/JP99/06688 dated Feb. 22, 2000.
A. Rogier et al., "Effect of Cobalt Substitution on Cationic Distribution in $LiNi_{1-y}Co_yO_2$ Electrode Materials", *Solid State Ionics*, 90 (1996) pp. 83–90.
K. M. Abraham et al., "$Li^+$–Conductive Solid Polymer Electrolytes with Liquid–Like Conductivity", Journal Electrochem. Society, vol. 137, No. 5, pp. 1657–1658 (1990).
M. Armand et al., "Polymeric Solid Electrolytes", Second International Meeting on Solid Electrolytes (1978).
International Search Report corresponding to application No. PCT/JP99/06687 dated Feb. 22, 2000.

* cited by examiner

Primary Examiner—Patrick Ryan
Assistant Examiner—M. Wills
(74) Attorney, Agent, or Firm—Ratner & Prestia (57) ABSTRACT

A negative electrode is characterized by its composite particles constructed in such a manner that at least part of the surrounding surface of nuclear particles containing at least one of tin, silicon and zinc as a constituent element, is coated with a solid solution or an inter-metallic compound, which is composed of, the element included in the nuclear particles, and at least one other element except the elements included in the nuclear particles selected from a group comprising group 2 elements, transition elements, group 12 elements, group 13 elements and group 14 elements except carbon of the Periodic Table. The present invention is characterized that the lithium content of the nuclear particles of the composite particles is 40–95 atomic percent of the theoretical limit of lithium content of each constituent element of the nuclear particles. Further, the batteries are first charged at a constant current and upon reaching the predetermined voltage, are charged at a constant voltage. The current density during charging are set at not more than 5 $mA/cm^2$ as a in the area where the positive and negative electrodes face each other.

20 Claims, 2 Drawing Sheets

NON-AQUEOUS ELECTROLYTE SECONDARY BATTERY

This application is a U.S. National Phase application of PCT International application PCT/JP99/06688.

FIELD OF THE INVENTION

The present invention relates to non-aqueous electrolyte secondary batteries and charging methods of the same, and especially relates to non-aqueous electrolyte secondary batteries (hereinafter, batteries) with high energy density, whose electrochemical properties such as charge/discharge capacity and charge/discharge cycle life have been enhanced by improvements of negative electrode materials and non-aqueous electrolytes.

BACKGROUND OF THE INVENTION

In recent years, lithium secondary batteries with non-aqueous electrolytes, which are used in such fields as mobile communications devices including portable information terminals and portable electronic devices, main power sources of portable electronic devices, small size domestic electricity storing devices, motor cycles using an electric motor as a driving source, electric cars and hybrid electric cars, have characteristics of a high electromotive force and a high energy density.

The lithium ion secondary batteries with an organic electrolytic solution, which use carbon materials as negative electrode active materials and lithium-containing composite oxides as positive electrode active materials, have higher voltage and energy density, and superior low-temperature properties compared with secondary batteries using aqueous solutions. As these lithium ion batteries do not use lithium metal in the negative electrode, they are superior in terms of cycle stability and safety, thus are now being commercialized rapidly. Lithium polymer batteries using macromolecular (polymer) gel electrolytes which contain an organic electrolytic solution, have been also under development as a new thin and light batteries.

When lithium metal with a high capacity is used as a negative electrode material, dendritic deposits are formed on the negative electrode during charging. Over repeated charging and discharging, these dendritic deposits penetrate through separators and polymer gel electrolytes to the positive electrode side, causing an internal short circuit. The deposited dendrites have a large specific surface area, therefore their reaction activity is high. Thus, it reacts with plasticizers (solvents) of the polymer gel electrolytes, lowering charge/discharge efficiency. This raises the internal resistance of the batteries, causing some particles to be excluded from the network of the electronic conduction, thereby lowering the charge/discharge efficiency of the battery. Due to these reasons, the lithium secondary batteries using lithium metal as a negative electrode material have a low reliability and a short cycle life.

Nowadays, lithium secondary batteries, which use, as a negative electrode material, carbon materials capable of intercalating and de-intercalating lithium ions, are commercially available. In general, lithium metal does not deposit on negative electrodes with carbon. Thus, short circuits are not caused by dendrites. However, the theoretical capacity of graphite which is one of the currently used carbon materials is 372 mAh/g, only one tenth of that of pure Li metal.

Other known negative electrode materials include pure metallic materials and pure non-metallic materials which form compounds with lithium. For example, composition formulae of compounds of tin (Sn), silicon (Si) and zinc (Zn) with the maximum theoretical amount of lithium are respectively $Li_{22}Sn_5$, $Li_{22}Si_5$, and LiZn, and within the range of these composition formulae, metallic lithium does not normally deposit. Thus, an internal short circuit is not caused by dendrites. Furthermore, electrochemical capacities between these compounds and each element in its pure form mentioned above is respectively 993 mAh/g, 4199 mAh/g and 410 mAh/g; all are larger than the theoretical capacity of graphite.

As other compound negative electrode materials, the Japanese Patent Laid-open Publication No. H07-240201 discloses a non-metallic silicide comprising transition elements. The Japanese Patent Laid-open Publication No. H09-63651 discloses negative electrode materials which are made of inter-metallic compounds comprising at least one of group 4B elements, phosphorus (P) and antimony (Sb), and have a crystal structure of one of the CaF2 type, the ZnS type and the AlLiSi type.

However, the foregoing high-capacity negative electrode materials have the following problems.

Pure metallic and pure non-metallic materials used as negative electrode materials, and which form compounds with lithium, commonly have inferior charge/discharge cycle properties compared with carbon negative electrode materials. The reason for this is assumed to be destruction of the negative electrode materials caused by volume expansion and contraction.

On the other hand, as negative electrode materials with improved cycle life properties, unlike the foregoing pure materials, the Japanese Patent Laid-open Publication No. H07-240201 and the Japanese Patent Laid-open Publication No. H09-63651 respectively disclose non-metallic silicides composed of transition elements and inter-metallic compounds composed of at least one of group 4B elements, phosphorus (P) and antimony (Sb), and with a crystal structure of one of the CaF2 type, the ZnS type and the AlLiSi type.

Batteries with negative electrode materials comprising non-metallic silicides composed of transition elements, and disclosed in the Japanese Patent Laid-open Publication No. H07-240201, have improved charge/discharge cycle properties compared with lithium metal negative electrode material, in terms of the capacities of embodiments of the invention and a comparative example at the first cycle, the fiftieth cycle and the hundredth cycle. However, when compared with a natural graphite negative electrode material, the increase in the capacity of the battery is only about 12%.

The materials disclosed in the Japanese Patent Laid-open Publication No. H09-63651 have a better charge/discharge cycle property than a Li-Pb alloy negative electrode material according to an embodiment and a comparative example. The materials also have a larger capacity compared with a graphite negative electrode material. However, the discharge capacity decreases significantly until the 10–20th charge/discharge cycles. Even when $Mg_2Sn$, which is considered to be better than any of the other materials, is used, the discharge capacity decreases to approximately 70% of the initial capacity after about the 20th cycle. Thus, they are inferior in terms of charge/discharge properties.

Regarding charging methods for these batteries, the Japanese Patent Laid-open Publication No. H06-98473 discloses a method in which a pulse current is added while charging a lithium secondary battery in order to restrict dendritic deposits of lithium on a lithium negative electrode. As for lithium ion secondary batteries whose negative electrodes comprise carbon materials, the Japanese Patent Laid-open Publication No. H04-206479 discloses a method in which the level of a charging current is controlled so as to be under a predetermined level during charging at a constant voltage in order to prevent lithium dendrites from depositing on a carbon negative electrode.

However, the charge/discharge cycle life properties vary depending on the charging method for the batteries. The predominant reason for this is as follows; since oxidation reduction potential during charging and values of overvoltage during electrochemical reaction are different, if charging current or voltage exceed predetermined tolerances, electrode reactions proceed unevenly, or other side reactions such as deposits of lithium, formation of film or generation of gas occur, thus lowering the charge/discharge cycle life properties.

The present invention aims to address the foregoing problems of the conventional batteries.

SUMMARY OF THE INVENTION

The negative electrode of the batteries of the present invention is characterized by its main material which uses composite particles constructed in such a manner that at least part of the surrounding surface of nuclear particles containing at least one of tin, silicon and zinc as a constituent element, is coated with a solid solution or an inter-metallic compound which is composed of, the element included in the nuclear particles and at least one other element (exclusive of the elements included in the nuclear particles) selected from a group comprising group 2 elements, transition elements, group 12 elements, group 13 elements and group 14 elements (exclusive of carbon) of the Periodic Table.

The present invention is further characterized by one of the following conditions:

the lithium content of the nuclear particles of the composite particles is 40–95 atomic percent of the theoretical limit of lithium content of each constituent element of the nuclear particles, namely, tin, silicon and zinc;

the lithium content in the composite particles is 50–90 atomic percent of their theoretical limit of lithium content; and when the negative electrode, exclusive of the current collector, contains an amount of lithium which allows no lithium to be electro-deposited, the volume expansion of the negative electrode exclusive of the current collector is 110–200%.

Further, according to the present invention, the batteries whose negative electrode comprises the composite particles, are charged at a predetermined constant current (I) until they reach a predetermined voltage (E), and upon reaching the predetermined voltage (E), charged at the predetermined constant voltage (E). The values of the current (I) and the current during the constant voltage charging are set at not more than 5 mA/cm$^2$ as a current density in the area where the positive and negative electrodes face each other.

With the foregoing construction, the problems associated with the conventional batteries are solved, thus providing non-aqueous electrolyte secondary batteries and their charging methods achieving high-energy density and superior cycle life properties.

DETAILED DESCRIPTION OF THE PREFERRED EMBODIMENTS

The batteries of the present invention comprise positive and negative electrodes capable of intercalating and de-intercalating of lithium, non-aqueous electrolyte and separators or solid electrolytes.

As a negative electrode material used in the present invention, composite particles whose nuclear particles composed of solid phase A are coated with solid phase B over the entire surface or part of the surface, are used. The solid phase A contains at least one of tin, silicon and zinc as a constituent element. The solid phase B is composed of a solid solution or an inter-metallic compound which are composed of at least one of tin, silicon and zinc, and at least one other element (exclusive of the foregoing constituent elements) selected from a group comprising group 2 elements, transition elements, group 12 elements, group 13 elements and group 14 elements (exclusive of carbon) of the Periodic Table. Hereinafter, the foregoing negative electrode materials are called composite particles. When the composite particles are used as a negative electrode material, the solid phase B helps to suppress expansion and shrinkage of the solid phase A caused by charging and discharging, thereby achieving a negative electrode material with superior charge/discharge cycle properties.

The present invention requires a content of lithium as follows:

the lithium content in the nuclear particles of the composite particles be 40–95 atomic percent of the theoretical limit of lithium content of each constituent element, namely, tin, silicon and zinc;

the lithium content in the composite particles be 50–90 atomic percent of their theoretical limit of lithium content; or when the negative electrode exclusive of the current collector contains an amount of lithium which allows no electro-deposition of lithium to occur, volume expansion of the negative electrode exclusive of the current collector be 110–200%.

Further, according to the present invention, charging is carried out combining two charging regions;

a constant current charging region wherein the batteries are charged at a constant current (I) until reaching a predetermined voltage (E); and a constant voltage charging region, after reaching the predetermined voltage (E), wherein the batteries are charged at the predetermined voltage (E). The charging current in the constant current charging region and the constant voltage charging region are set at not more than 5 mA/cm$^2$ as a current density of the area where the positive and the negative electrodes face each other.

With the foregoing construction, the batteries of the present invention enjoy a higher capacity and smaller reduction rates in the discharge capacity up to the 10–20th charge/discharge cycles.

It is considered that the solid phase A of the negative electrode material of the present invention mainly contributes to a higher charge/discharge capacity since it contains at least one of Sn, Si and Zn as a constituent element, and the solid phase B which coats part or entire surface of the nuclear particles comprising the solid phase A, contributes to improvement of the charge/discharge cycle properties. The amount of lithium contained in the solid phase B is normally less than that contained in metal, a solid solution or an inter-metallic compound.

In other words, the negative electrode material used in the present invention is constructed such that particles which contain at least one of high-capacity Sn, Si and Zn as a constituent element, are coated with the solid solution or the inter-metallic compound, which are resistant to pulverization. The solid solution or the inter-metallic compound in the coating layer prevents significant changes in crystal structure, in other words, significant changes in the volume of the nuclear particles caused by electrochemical intercalating and de-intercalating of lithium. In this manner, pulverization of the nuclear particles is restricted.

The following is a manufacturing method of composite particles used for the negative electrode materials.

In one manufacturing method of the composite materials, a fused mixture of elements contained in the composite particles at a predetermined composition ratio is quenched and solidified by dry-spraying, wet-spraying, roll-quenching or turning-electrode method. The solidified material is treated with heat lower than the solid phase line temperature of a solid solution or an inter-metallic compound. The solid phase line temperature is determined by the composition ratio. The process of quenching and solidifying of the fused mixture allows the solid phase A to deposit as a nucleus of a particle, and at the same time, allows the solid phase B, which coats part of or the whole surface of the solid phase A, to deposit. The heat treatment following the foregoing process enhances evenness of the solid phase A and the solid phase B. Even when the heat treatment is not conducted, composite particles suitable for the present invention can be obtained. Apart from the quenching method mentioned above, other methods are applicable providing they can quench the fused mixture rapidly and adequately.

In another manufacturing method, a layer of deposits comprising essential elements in forming solid phase B is formed on the surface of the powder of the solid phase A. The layer is heat treated at temperatures lower than the solid phase line temperature. This heat treatment allows constituent elements within the solid phase A to disperse throughout the deposit layer to form the solid phase B as a coating layer. The deposit layer can be formed by plating or by a mechanical alloying method. In the case of the mechanical alloying method, the heat treatment is not always necessary. Other methods can also be used on the condition that they can form the deposit layer.

As a conductive material for the negative electrode, any electronic conductive materials can be used. Examples of such materials include graphite materials including natural graphite (scale-like graphite) synthetic graphite and expanding graphite; carbon black materials such as acetylene black, Ketzen black (highly structured furnace black), channel black, furnace black, lamp black and thermal black; conductive fibers such as carbon fibers and metallic fibers; metal powders such as copper and nickel; and organic conductive materials such as polyphenylene derivatives. These materials can be used independently or in combination. Among these conductive materials, synthetic graphite, acetylene black and carbon fibers are especially favorable.

The amount of these conductive materials to be added is not specifically defined, however, 1–50 wt %, especially 1–30% of the negative electrode materials is desirable. As negative electrode materials (composite particles) of the present invention are themselves conductive, even if conductive materials are not added, the battery can still actually function. Therefore, the battery has more room available to contain composite particles.

Binders for the negative electrode can be either thermoplastic resin or thermosetting resin. Desirable binders for the present invention includes the following materials; polyethylene, polypropylene, polytetrafluoroethylene (PTFE), polyvinylidene fluoride (PVDF), styrene-butadiene rubber, a tetrafluoroethylene-hexafluoropropylene copolymer (FEP), a tetrafluoroethylene-perfluoroalkyl vinyl ether copolymer (PFA), a vinyliden fluoride-hexafluoropropylene copolymer, a vinyliden fluoride-chlorotrifluoroethylene copolymer, a ethylene-tetrafluoroethylene copolymer (ETFE), poly chlorotrifluoroethylene (PCTFE), a vinyliden fluoride-pentafluoropropylene copolymer, a propylene-tetrafluoroethylene copolymer, a ethylene-chlorotrifluoroethylene copolymer (ECTFE), a vinyliden fluoride-hexafluoropropylene-tetrafluoroethylene copolymer, a vinyliden fluoride perfluoromethyl vinyl ether-tetrafluoroethylene copolymer, an ethylene-acrylic acid copolymer or its Na+ ion crosslinking body, an ethylene-methacrylic acid copolymer or its Na+ ion crosslinking body, a methyl acrylate copolymer or its Na+ ion crosslinking body, and an ethylene-methyl methacrylate copolymer or its Na+ ion crosslinking body. Favorable materials among these materials are styrene butadiene rubber, polyvinylidene fluoride, an ethylene-acrylic acid copolymer or its Na+ ion crosslinking body, an ethylene-methacrylic acid copolymer or its Na+ ion crosslinking body, a methyl acrylate copolymer or its Na+ ion crosslinking body, and an ethylene-methyl methacrylate copolymer or its Na+ ion crosslinking body.

As a current collector for the negative electrode, any electronic conductor can be used on the condition that it does not chemically change in the battery. For example, stainless steel, nickel, copper, titanium, carbon, conductive resin, as well as copper and stainless steel whose surfaces are coated with carbon, nickel or titanium can be used. Especially favorable materials are copper and copper alloys. Surfaces of these materials can be oxidized. It is desirable to treat the surface of the current collector to make it uneven. Usable forms of the foregoing materials as the current collector include a foil, a film, a sheet, a mesh sheet, a punched sheet, a lath form, a porous form, a foamed form and a fibrous form. The thickness is not specifically defined however, normally those of 1–500 μm in thickness are used.

As positive electrode active materials, lithium compounds or non-lithium containing compounds can be used. Such compounds include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$ (M is at least one of Na, Mg, Sc, Y, Mn, Fe, Co, Ni, Cu, Zn, Al, Cr, Pb, Sb and B, and x=0–1, Y=0–0.9, z=2.0–2.3). The value of x is the value before charging and discharging, thus it changes along with charging and discharging. Other usable positive electrode materials include transition metal chalcogenides, a vanadium oxide and its lithium compounds, a niobium oxide and its lithium compounds, a conjugate polymer using organic conductive materials, and shevril phase compounds. It is also possible to use a plurality of different positive electrode materials in a combined form. The average diameter of particles of the positive electrode active materials is not specifically defined, however, desirably it is 1–30 μm.

Conductive materials for the positive electrode can be any electronic conductive material on the condition that it does not chemically change within the range of charge and discharge electric potentials of the positive electrode materials in use. Examples of such materials include graphite materials including natural graphite (scale-like graphite) and synthetic graphite; carbon black materials such as acetylene black, Ketzen black, channel black, furnace black, lamp black and thermal black; conductive fibers such as carbon fibers and metallic fibers; fluorinated carbon; metal powders such as aluminum; conductive whiskers such as a zinc oxide and potassium titanate, conductive metal oxides such as a titanium oxide, and organic conductive materials such as polyphenylene derivatives. These materials can be used independently or in combination. Among these conductive materials, synthetic graphite and acetylene black are especially favorable.

The total amount of the conductive materials to be added is not specifically defined, however, 1–50 wt %, especially 1–30% of the positive electrode materials is desirable. In the case of carbon and graphite, 2–15 wt % is especially favorable.

Binders for the positive electrode can be either thermoplastic resin or thermosetting resin. The binders for the negative electrode mentioned earlier can be used effectively, however, PVDF and PTFE are more preferable.

Current collectors for the positive electrode of the present invention can be any electronic conductive material on the condition that it does not chemically change within the range of charge and discharge electric potentials of the positive electrode materials in use. For example, the current collectors for the negative electrode mentioned earlier can be used preferably. The thickness of the current collectors is not specifically defined, however, those of 1–500 $\mu$m in thickness are used.

As electrode mixtures for the positive electrode and the negative electrode plates, conductive materials, binders, fillers, dispersants, ionic conductors, pressure enhancers, and other additives can be used. Any fiber materials, which do not change chemically in the battery, can be used as fillers. In general, fibers such as fibers of olefin polymers such as polypropylene and polyethylene, and glass fibers and carbon fibers are used as fillers. The amount of the filler to be added is not specifically defined however, it is desirably 0–30 wt % of the electrode binders.

As for the construction of the positive electrode and the negative electrode, it is favorable that at least the surfaces of the negative electrode and the positive electrode where there are the mixtures are facing each other.

The electrolytic solution is composed of non-aqueous solvent and lithium salts dissolved therein.

Examples of non-aqueous solvents include cyclic carbonates such as ethylene carbonate (EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), and dipropyl carbonate (DPC); aliphatic carboxylates such as methyl formate, methyl acetate, methyl propionate, and ethyl propionate; gamma-lactones such as gamma-butyrolactone; acyclic ethers such as 1,2-dimethoxy ethane (DME), 1,2-diethoxy ethane (DEE), and ethoxy methoxy ethane (EME); cyclic ethers such as tetrahydrofuran and 2-methyl tetrahydrofuran; and non-protonic organic solvents such as dimethyl sulfoxide, 1,3-dioxolane, formamide, acetamide, dimethylformamide, dioxolane, acetonitrile, propylnitrile, nitromethane, ethyl monoglime, triester of phosphoric acid, trimethoxy methane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propane saltane, anisole, dimethyl sulfoxide and N-methylpyrolidon, These solvents are used independently or as a mixture of two or more solvents. Mixtures of cyclic carbonate and acyclic carbonate, or cyclic carbonate, acyclic carbonate and aliphatic carboxylate are especially favorable.

Lithium salts which dissolve into the foregoing solvents include $LiClO_4$, $LiBF_4$, $LiPF_6$, $LiAlCl_4$, $LiSbF_6$, LiSCN, LiCl, $LiCF_3SO_3$, $LiCF_3CO_2$, Li $(CF_3SO_2)_2$, $LiAsF_6$, LiN $(CF_3SO_2)_2$, $LiB_{10}Cl_{10}$, lithium salt of lower aliphatic carboxylic acid, LiCl, LiBr, LiI, chloroboron lithium, 4-phenil boric acid, and an imide group. These lithium salts can be dissolved individually or as a mixture of two or more in the non-aqueous solvents mentioned earlier, and used as an electrolytic solution. It is especially favorable to include $LiPF_6$ in the electrolytic solution.

Especially favorable non-aqueous electrolytic solutions of the present invention include at least EC and EMC, and as a supporting salt, $LiPF_6$. The amount of the electrolytic solution to be added to the battery is not specifically defined. Considering the amount of the positive electrode and the negative electrode materials and the size of the battery, the required amount can be used. The amount of the supporting electrolytes against the non aqueous solvents is not specifically defined, however, 0.2–2 mol/l, especially 0.5–1.5 mol/l is preferable.

Instead of an electrolytic solution, the following solid electrolytes, which are categorized into inorganic solid electrolytes and organic solid electrolytes, can also be used.

Lithium nitrides, lithium halides, and lithium oxides are well known inorganic solid electrolytes. Among them, $Li_4SiO_4$, $Li_4SiO_4$—LiI—LiOH, $xLi_3PO_4$-$(1-x)Li_4SiO_4$, $Li_2SiS_3$, $Li_3PO_4$—$Li_2S$—$SiS_2$ and phosphorus sulfide compounds are effectively used.

As organic solid electrolytes, polymer materials such as polyethylene oxides, polypropylene oxides, polyphosphazene, polyaziridine, polyethylene sulfides, polyvinyl alcohol, polyvinylidene fluorides, polyhexafluoropropylene and their derivatives, mixtutres and complexes are effectively used.

It is effective to add other compounds to the electrolytic solution in order to improve discharge and charge/discharge properties. Such compounds include triethyl phosphite, triethanolamine, cyclic ethers, ethylene diamine, n-glime, pyridine, triamide hexaphosphate, nitrobenzene direvatives, crown ethers, quaternary ammonium salt, and ethylene glycol dialkyl ether.

As a separator of the present invention, thin films with fine pore, which have a large ion permeability, a predetermined mechanical strength and insulation properties, are used. It is desirable that the pores of the separators close at or above a predetermined temperature to increase resistance. For the sake of an organic solvent resistance and a hydrophobic property, olefin polymers including polypropylene and polyethylene can be used individually or in combination. Sheets, non-wovens and wovens made from glass fiber can also be used. The diameter of the fine pores of the separators is desirably set within the range through which no positive electrode and negative electrode materials, binding materials, and conductive materials separated from electrode sheets can penetrate. A desirable range is, for example, 0.01–1 $\mu$m. The thickness of the separator is generally 10–300 $\mu$m. The porosity is determined by the permeability of electrons and ions, material and membrane pressure. In general, however, the porosity is desirably 30–80%.

It is also possible to construct a battery such that polymer materials, which absorb and retain an organic electrolytic solution comprising solvents and lithium salts dissolved in the solvents, are included in the electrode mixtures of the positive and negative electrodes, and porous separators, which comprise polymers capable of absorbing and retaining the organic electrolytic solution, are formed integrally with the positive and the negative electrode. As the polymer materials, any materials capable of absorbing and retaining organic electrolytic solutions can be adopted. Among such materials, a copolymer of vinylidene fluoride and hexafluoropropylene is especially favorable.

The following is a detailed description of the materials used in the batteries of the present invention.

The positive electrode and the negative electrode of the battery of the present invention are constructed such that a current collector is coated with a electrode mixture layer which includes, as main constituents, the active materials and the negative electrode materials capable of electrochemically and reversibly intercalating and de-intercalating lithium ions, and conductive materials as well as binders.

(Manufacture of the composite particles)

In Table 1, components (pure elements, inter-metallic compound, solid solution) of the solid phase A and the solid phase B of the composite particles used in the preferred embodiments of the present invention, composition ratios of elements, fusion temperatures, and solid phase line temperatures are shown. Commercially available highly pure reagents are used as ingredients for each element.

To obtain solid materials, powder or a block of each element contained in the composite particles is put into a fusion vessel in the composition ratio shown in Table 1, fused at the fusion temperature also shown in Table 1. The fused mixture is quenched by the roll-quenching method and solidified to obtain a solid material which is then heat treated at temperatures of 10° C.–50° C. lower than the solid phase line temperatures shown in Table 1, in an inert atmosphere for 20 hours. After being heat treated, the material is ground with a ball mill, and classified using a sieve to prepare composite particles of 45 μm or less. An electron microscope observation confirmed, part of or the whole surface of composite particles of the solid phase A have covered with the solid phase B.

Figure 1:
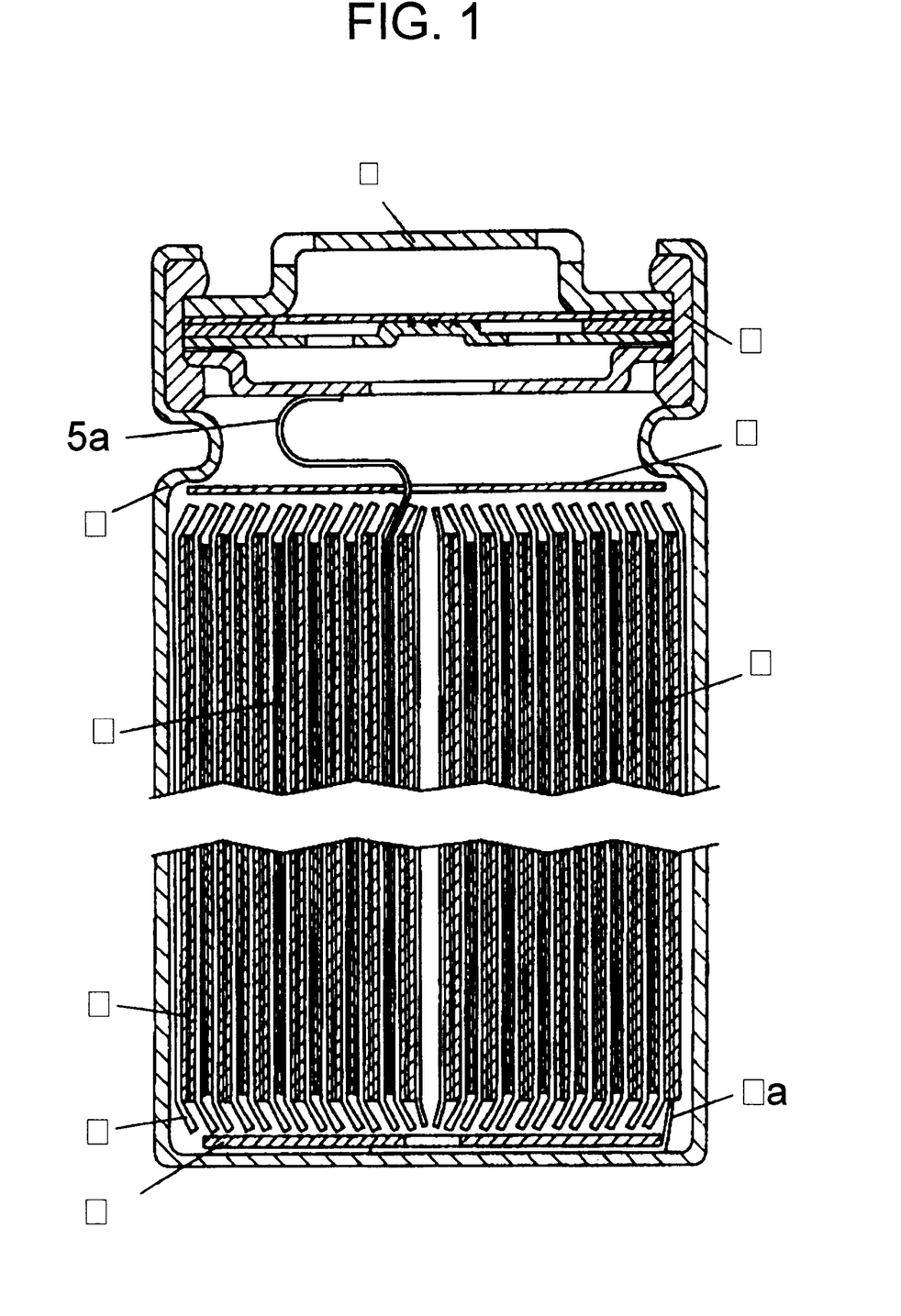
FIG. 1 shows a vertical cross section of a cylindrical non-aqueous electrolyte battery of the present invention.

FIG. 1 shows a vertical cross section of a cylindrical battery of the present invention. In FIG. 1, a positive electrode plate 5 and a negative electrode plate 6 are spirally rolled a plurality of times via separators 7, and placed in a battery casing 1. Coming out from the positive electrode plate 5 is a positive electrode lead 5a, which is connected to a sealing plate 2. In the same manner, a negative electrode lead 6a comes out from a negative electrode plate 6, and is connected to the bottom of the battery casing 1. Insulating gasket 3 separates sealing plate 2 from battery casing 1.

Electronically conductive metals and alloys having organic electrolytic solution resistance can be used for the battery casing and lead plates. For example, such metals as iron, nickel, titanium, chromium, molybdenum, copper and aluminum and their alloys can be used. For the battery casing, stainless steel plate or processed Al-Mn alloy plate is favorably used, and for the positive electrode lead and the negative electrode lead, respectively aluminum and nickel are most favorable. For the battery casing, engineering plastics can be used independently or with metals in order to reduce weight.

Insulating rings 8 are disposed on the top and bottom of an electrode plate group 4. A safety valve can be used as a sealing plate. Apart from the safety valve, other conventionally used safety elements can be disposed. As an anti-overcurrent element, for example, fuses, bimetal and PTC elements can be used. To deal with increases in internal pressure of the battery casing, a cut can be provided to the battery casing, a gasket cracking method or a sealing plate cracking method can be applied, or the connection to the lead plate can be severed. As other methods, a protective circuit incorporating anti-overcharging and anti-overdischarging systems, can be included in or connected independently to a charger. As an anti-overcharging method, current can be cut off by an increase in internal pressure of the battery. In this case, a compound which raises internal pressure can be mixed with the electrode mixture or with the electrolytes. Such compounds include carbonates such as $Li_2CO_3$, $LiHCO_3$, $Na_2CO_3$, $NaHCO_3$, $CaCO_3$ and $MgCO_3$.

The cap, the battery casing, the sheet and the lead plate can be welded by conventional methods such as an alternative current or a direct current electric welding, a laser welding and an ultrasonic welding. As a sealing material, conventional compounds and composites such as asphalt can be used.

To prepare the negative electrode plate 6, 20 wt % of carbon powder and 5 wt % PVDF are mixed with 75 wt % of the composite particles synthesized under the foregoing conditions. The mixture is dispersed in dehydrated N-methyl pyrrolidone to form a slurry. The slurry is coated on a negative electrode current collector comprising copper foil, dried and rolled under pressure.

To prepare the positive electrode plate 5, 10 wt % of carbon powder and 5 wt % of PVDF are mixed with 85 wt % of lithium cobaltate powder. The mixture is dispersed in dehydrated N-methyl pyrrolidinone to form a slurry. The slurry is coated on a positive electrode current collector comprising copper foil, and dried and rolled under pressure.

LiPF6 1.5 mol/l is dissolved in a mixed solvent of EC and EMC which are mixed in a ratio of 1:1 by volume, and used as an electrolytic solution.

Using materials shown in Table 1 for the negative electrode, batteries are prepared in the manner described above. The cylindrical batteries prepared are 18 mm in diameter and 65 mm in height.

These batteries are charged at a constant current of 100 mA upto an amounts of 100 atomic percent, 95 atomic percent, 90 atomic percent, 50 atomic percent, 30a atomic percent, 20 atomic percent of the theoretical lithium content of the composite particles, and then discharged at the constant current of 100 mA until their voltage becomes 2.0 V. This charge/discharge cycle is repeated in a temperature-controlled oven at 20° C. 100 times. The ratio of the discharge capacity at the 100th cycle to that of the initial cycle is defined as the capacity retention rate. The theoretical lithium content capacity ratio of the solid phase A and the rate of volume expansion of the negative electrode exclusive of the current collector at the 100th cycle are shown in Table 2.

Among the lithium contained in the composite particles, the amount contained in the solid phase A is calculated based on the analytical curve showing the relationship between the amount of lithium and diffraction peak shift obtained by X ray analysis.

As Table 2 shows, when the solid phase A is Sn, if the lithium content of the composite particles is 100–50% or that of the solid phase A is 100%–40%, the initial discharge capacity is not less than 1600 mAh. However, when the lithium content of the composite particles is 30% or that of the solid phase A is 20%, the initial discharge capacity declines to 1100~1200 mAh, lower than the battery with conventional graphite materials.

As for the discharge capacity at the 100th cycle, when the lithium content of the composite particles is not less than 95% or that of the solid phase A is not less than 98%, the capacity retention rate becomes 91% or less, lowering to the vicinity of 1600 mAh level. Whereas when the lithium content of the composite particles is 50–90% or that of the solid phase A is 40–95%, the capacity retention rate becomes 95% or higher, maintaining the discharge capacity at the 100th cycle at 1700 mAh or more. The volume expansion of the negative electrode exclusive of the current collector is 200% or less when the lithium content of the composite particle is not more than 90% or that of the solid phase A is not more than 95%.

When the solid phase A is Si, if the lithium content of the composite particles is 100–50%, or that of the solid phase A is 100%–40%, the initial discharge capacity is not less than 1700 mAh. However, when the lithium content of the composite particles is 30% or that of the solid phase A is 20%, the initial discharge capacity declines to the 1200 mAh level, lower than the conventional battery with graphite materials.

As for the discharge capacity at the 100th cycle, when the lithium content of the composite particles is not less than 95% or that of the solid phase A is not less than 98%, the capacity retention rate becomes 91% or less, lowering to the vicinity of 1700 mAh level. Whereas when the lithium content of the composite particles is 50–90% or that of the solid phase A is 40–95%, the capacity retention rate becomes 95% or higher, maintaining the discharge capacity at the 100th cycle at 1800 mAh or more. The volume expansion of the negative electrode exclusive of the current collector is 200% or less when the lithium content of the composite particle is not more than 90% or that of the solid phase A is not more than 95%.

When the solid phase A is Zn, if the lithium content of the composite particles is 100–50% or that of the solid phase A is 100%–40%, the initial discharge capacity is not less than 1800 mAh. However, when the lithium content of the composite particles is 30% or that of the solid phase A is 20%, the initial discharge capacity declines to the 1200 mAh level, lower than the battery with conventional graphite materials.

As for the discharge capacity at the 100th cycle, when the lithium content of the composite particles is not less than 95% or that of the solid phase A is not less than 98%, the capacity retention rate becomes 91% or less, lowering to the vicinity of 1600~1700 mAh level. Whereas when the lithium content of the composite particles is 50–90% or that of the solid phase A is 40–95%, the capacity retention rate becomes 95% or higher, maintaining the discharge capacity at the 100th cycle at 1800 mAh or more. The volume expansion of the negative electrode exclusive of the current collector is 200% or less when the lithium content of the composite particle is not more than 90% or that of the solid phase A is not more than 95%.

In all Sn, Si, and Zn cases, it is assumed that the levels of the volume expansion of the negative electrode determine the cycle properties.

As thus far described, compared with the conventional batteries using graphite as a negative electrode material, the batteries of this embodiment achieve a higher capacity and superior cycle properties with the capacity retention rate at the 100th cycle being 95% or higher when they satisfy one of the following conditions;

the lithium content of the solid phase A is 40–95 atomic percent of the theoretical limit of lithium content of each constituent element of the solid phase A, namely Sn, Si, and Zn;

the lithium content of the solid phase A is 50–90 atomic percent of the theoretical limit of lithium content of the composite particles; and the volume expansion rate of the negative electrode exclusive of the current collector is 110–200%.

The second preferred embodiment

The batteries of the first preferred embodiment are charged by the charging method of the present invention. The charging method of the present invention is described in detail below.

Figure 2:
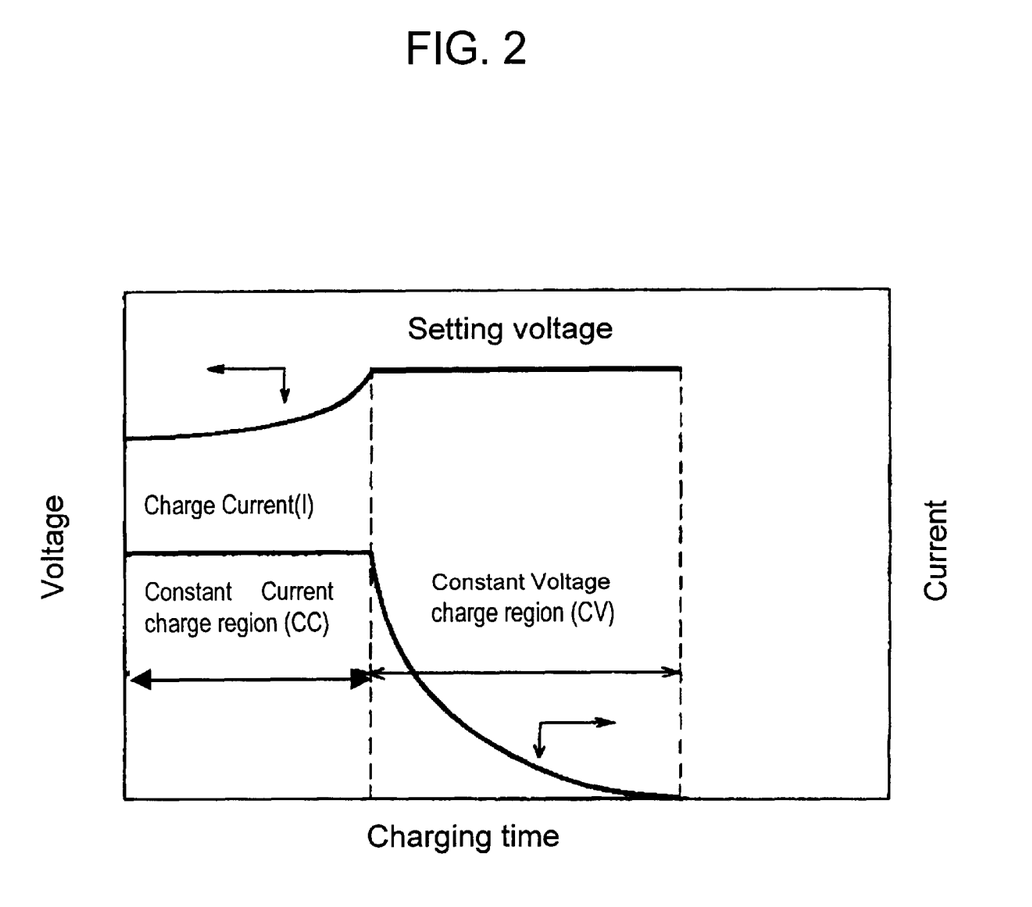
FIG. 2 is a graph schematically showing charging current and voltage according to the charging method of the present invention.

FIG. 2 is a graph schematically showing charging current and voltage in accordance with the charging method of the preferred embodiments of the present invention.

In the present invention, the batteries are charged in two charging regions in combination;

a constant current charging region (CC) applied until the voltage of the battery reaches a predetermined voltage (V), and in which the batteries are charged at a constant current level (I); and a constant voltage charging region (CV) applied after the voltage of the battery reaches a predetermined voltage (V), and in which the batteries are charged at a constant voltage of a predetermined voltage level (E). The charging is terminated when the charged current reaches 100 mA in the constant voltage region.

The charging current (I) represents the density of the electric current per in the area where the positive and the negative electrodes face each other. In this embodiments, they are set at 1, 3, 5 and 7 mA/cm$^2$. The predetermined voltage (V) is 4.1V. The batteries are discharged at the constant current of 100 mA, discharge is terminated when the voltage reaches 2.0V. The charge/discharge cycle life test is conducted at 20° C.

Comparative Example

A battery is prepared using scale-like synthetic graphite (average particle diameter, 25 μm) as a negative electrode material but otherwise in the same manner as the preferred embodiment mentioned earlier. A test is conducted on that battery in the same manner as the preferred embodiments with the exception of setting the current density in the area where the positive and negative electrodes face each other at 3 mA/cm$^2$.

Table 3 shows the initial discharge capacity and the discharge capacity of the battery at the 300th cycle as well as the capacity retention rate namely a ratio of the discharge capacity at the 300th cycle to that of the initial cycle.

As Table 3 shows, all of the batteries of the preferred embodiments of the present invention enjoy higher initial capacities than the battery prepared for comparison by using graphite as a negative electrode material. When the current density during charging is set at 5 mA/cm$^2$ or less, the batteries of the preferred embodiments achieve the capacity retention rate of 70% or higher, showing a better charge/discharge cycle life property than the comparative battery.

When the batteries are broken at the 300th cycle to visually inspect their positive and negative electrodes, separators and electrolytic solution, the batteries whose capacity retention rates are 70% or less have, on the surfaces of the negative electrode and the separators, deposits which are considered to be decomposition products of the electrolytic solution. The decomposition products inhibit electrode reactions, lowering the discharge capacities. It is considered that the decomposition products are formed such that when the current density raises during charging, the negative electrode potential is polarized in a base direction, causing the electrolytic solution to decompose as a side reaction to make deposits.

Thus far described, the charging method for a high-energy density battery with superior charge/discharge cycle life properties can be achieved by following the procedure below. The composite particles whose nuclear particles composed of solid phase A are coated with solid phase B over the whole surface or part of the surface, are used as a negative electrode material. The solid phase A contains at least one of tin, silicon and zinc as a constituent element. The solid phase B is composed of a solid solution or an intermetallic compound composed of at least one of constituent element of the solid phase A and at least one element (exclusive of the foregoing constituent elements) selected from a group comprising group 2 elements, transition elements, group 12 elements, group 13 elements and group 14 elements (exclusive of carbon) of the Periodic Table. The battery is charged at a predetermined constant current until reaching a predetermined voltage, and subsequently, charged at a predetermined constant voltage. The values of the charging current in the constant current charging and the constant voltage charging regions are regulated by setting a current density at the area where the positive and the negative electrodes face each other at not more than 5 mA/cm$^2$.

In this embodiment, although the lower limit of the current density during charging is set at 1 mA/cm$^2$, even lower current density is applicable. In such a case, however, it takes longer before the battery is completely charged. Therefore, considering a required charging duration, the charging current can be set within a range up to 5 mA/cm$^2$. It is obvious that, from the view point of the design of the battery, the area of the electrodes can be changed.

Regarding constituent elements of the negative electrode materials, when the solid phase A is Sn, Mg selected from group 2 elements, Fe and Mo from transition elements, Zn and Cd from group 12 elements, In from group 13 elements and Pb from group 14 elements are selected. However, similar results are obtained with other elements selected from each group. The composition ratio of the constituent elements of the negative electrode material is not specifically defined, on the condition that two phases are created and one of which (solid phase A) is mainly composed of Sn, and is partly or entirely covered with the other phase (solid phase B). The solid phase A can be composed not only of Sn but also traces of other elements such as O, C, N, S, Ca, Mg, Al, Fe, W, V, Ti, Cu, Cr, Co, and P.

When the solid phase A is Si, Mg selected from group 2 elements, Co and Ni from transition elements, Zn from group 12 elements, Al from group 13 elements and Sn from group 14 elements are used. However, similar results are obtained with other elements selected from each group.

Similarly, when the solid phase A is Zn, Mg selected from group 2 elements, Cu and V from transition elements, Cd from group 12 elements, Al from group 13 elements and Ge from group 14 elements are used. However, similar results are obtained with other elements selected from each group. The composition ratio of the constituent elements of the negative electrode material is not specifically defined, on the condition that two phases are created and one of which (solid phase A) is mainly composed of Si and Zn, and is partly or entirely covered with the other phase (solid phase B). The solid phase A can be composed not only of Si and Zn but also traces of elements such as O, C, N, S, Ca, Mg, Al, Fe, W, V, Ti, Cu, Cr, Co, and P.

The charging method for the batteries of the present invention can be applied for portable information terminals, portable electronic devices, small size domestic electricity storing devices, motor cycles, electric cars and hybrid electric cars. However, the application of the battery is not limited to the foregoing.

Applicability in the industry

The batteries and the charging method of the same using the non-aqueous electrolytes and the composite particles for the negative electrode of the present invention help to improve the charge/discharge cycle life properties of high energy-density batteries more than conventional batteries using carbon materials as a negative electrode material. As such, the batteries of the present invention can be used in portable information terminals, portable electronic devices, small size domestic electricity storing devices, motor cycles, electric cars and hybrid electric cars, thereby offering remarkable benefits when industrially applied.

TABLE 1

| Negative electrode material | Phase A | Phase B | Melting temperature (° C.) | Solid phase line temperature (° C.) | Composition (Atom %) |
|---|---|---|---|---|---|
| Material A | Sn | Mg$_2$Sn | 770 | 204 | Sn:Mg = 50:50 |
| Material B | Sn | FeSn$_2$ | 1540 | 513 | Sn:Fe = 70:30 |
| Material C | Sn | MoSn$_2$ | 1200 | 800 | Sn:Mo = 70:30 |
| Material D | Sn | Zn, Sn Solid S. | 420 | 199 | Sn:Zn = 90:10 |
| Material E | Sn | Cd, Sn Solid S. | 232 | 133 | Sn:Cd = 95:5 |
| Material F | Sn | In, Sn Solid S. | 235 | 224 | Sn:In = 98:2 |
| Material G | Sn | Sn, Pb Solid S. | 232 | 183 | Sn:Pb = 80:20 |
| Material H | Si | Mg$_2$Si | 1415 | 946 | Si:Mg = 70:30 |
| Material I | Si | CoSi$_2$ | 1495 | 1259 | Si:Co = 85:15 |
| Material J | Si | NiSi$_2$ | 1415 | 993 | Si:Ni = 69:31 |
| Material K | Si | Si, Zn Solid S. | 1415 | 420 | Si:Zn = 50:50 |
| Material L | Si | Si, Al Solid S. | 1415 | 577 | Si:Al = 40:60 |
| Material M | Si | Si, Sn Solid S. | 1415 | 232 | Si:Sn = 50:50 |
| Material N | Zn | Mg$_2$Zn$_{11}$ | 650 | 364 | Zn:Mg = 92.9:7.8 |
| Material O | Zn | Zn, Cu Solid S. | 1085 | 425 | Zn:Cu = 97:3 |
| Material P | Zn | VZn$_{11}$ | 700 | 420 | Zn:V = 94:6 |
| Material Q | Zn | Zn, Cd Solid S. | 420 | 266 | Zn:Cd = 50:50 |
| Material R | Zn | Zn, Al Solid S. | 661 | 381 | Zn:Al = 90:10 |
| Material S | Zn | Zn, Ge Solid S. | 938 | 394 | Zn:Ge = 97:3 |

TABLE 2

| | Negative electrode material | Carging load of composite particle (%) | Initial Discharge Capacity (mAh) | 100th Discharge Capacity (mAh) | capacity retention rate (%) | Lithium content of phase A (atomic %) | Negative electrode expansion (%) |
|---|---|---|---|---|---|---|---|
| 1 | Material A | 100 | 1872 | 1685 | 90 | 100 | 260 |
| 2 | | 95 | 1820 | 1620 | 89 | 98 | 230 |
| 3 | | 90 | 1802 | 1766 | 95 | 95 | 200 |
| 4 | | 50 | 1755 | 1702 | 97 | 40 | 110 |
| 5 | | 30 | 1205 | 1181 | 98 | 20 | 105 |
| 1 | B | 100 | 1864 | 1659 | 89 | 100 | 260 |
| 2 | | 95 | 1870 | 1664 | 89 | 98 | 230 |
| 3 | | 90 | 1849 | 1757 | 95 | 95 | 200 |
| 4 | | 50 | 1773 | 1720 | 97 | 40 | 110 |
| 5 | | 30 | 1177 | 1154 | 98 | 20 | 105 |
| 1 | C | 100 | 1847 | 1625 | 88 | 100 | 260 |
| 2 | | 95 | 1834 | 1632 | 98 | 98 | 230 |
| 3 | | 90 | 1825 | 1734 | 95 | 95 | 200 |
| 4 | | 50 | 1800 | 1746 | 97 | 40 | 110 |
| 5 | | 30 | 1167 | 1144 | 98 | 20 | 105 |
| 1 | D | 100 | 1852 | 1706 | 90 | 100 | 260 |
| 2 | | 95 | 1832 | 1636 | 89 | 98 | 230 |
| 3 | | 90 | 1829 | 1737 | 95 | 95 | 200 |
| 4 | | 50 | 1778 | 1725 | 97 | 40 | 110 |
| 5 | | 30 | 1145 | 1123 | 98 | 20 | 105 |
| 1 | E | 100 | 1875 | 1706 | 91 | 100 | 260 |
| 2 | | 95 | 1874 | 1668 | 89 | 98 | 230 |
| 3 | | 90 | 1861 | 1768 | 95 | 95 | 200 |
| 4 | | 50 | 1813 | 1759 | 97 | 40 | 110 |
| 5 | | 30 | 1201 | 1177 | 98 | 20 | 105 |
| 1 | | 100 | 1861 | 1694 | 91 | 100 | 260 |
| 2 | | 95 | 1852 | 1649 | 89 | 98 | 230 |
| 3 | | 90 | 1845 | 1752 | 95 | 95 | 200 |
| 4 | | 50 | 1823 | 1769 | 97 | 40 | 110 |
| 5 | | 30 | 1173 | 1150 | 98 | 20 | 105 |
| 1 | G | 100 | 1871 | 1683 | 90 | 100 | 260 |
| 2 | | 95 | 1848 | 1645 | 89 | 98 | 230 |
| 3 | | 90 | 1833 | 1741 | 95 | 95 | 200 |
| 4 | | 50 | 1774 | 1721 | 97 | 40 | 110 |
| 5 | | 30 | 1154 | 1131 | 98 | 20 | 105 |
| 1 | H | 100 | 1956 | 1760 | 90 | 100 | 260 |
| 2 | | 95 | 1931 | 1718 | 89 | 98 | 230 |
| 3 | | 90 | 1967 | 1869 | 95 | 95 | 200 |
| 4 | | 50 | 1902 | 1845 | 97 | 40 | 110 |
| 5 | | 30 | 1291 | 1266 | 98 | 20 | 105 |
| 1 | I | 100 | 1940 | 1727 | 89 | 100 | 260 |
| 2 | | 95 | 1924 | 1713 | 89 | 98 | 230 |
| 3 | | 90 | 1911 | 1815 | 95 | 95 | 200 |
| 4 | | 50 | 1877 | 1820 | 97 | 40 | 110 |
| 5 | | 30 | 1259 | 1234 | 98 | 20 | 105 |
| 1 | J | 100 | 1974 | 1796 | 91 | 100 | 260 |
| 2 | | 95 | 1973 | 1755 | 89 | 98 | 230 |
| 3 | | 90 | 1926 | 1829 | 95 | 95 | 200 |
| 4 | | 50 | 1846 | 1790 | 97 | 40 | 110 |
| 5 | | 30 | 1269 | 1244 | 98 | 20 | 105 |
| 1 | K | 100 | 1969 | 1772 | 90 | 100 | 260 |
| 2 | | 95 | 1944 | 1730 | 89 | 98 | 230 |
| 3 | | 90 | 1918 | 1822 | 95 | 95 | 200 |
| 4 | | 50 | 1878 | 1821 | 97 | 40 | 110 |
| 5 | | 30 | 1269 | 1244 | 98 | 20 | 105 |
| 1 | L | 100 | 1989 | 1750 | 88 | 100 | 260 |
| 2 | | 95 | 1966 | 1749 | 89 | 98 | 230 |
| 3 | | 90 | 1921 | 1824 | 95 | 95 | 200 |
| 4 | | 50 | 1869 | 1812 | 97 | 40 | 110 |
| 5 | | 30 | 1266 | 1241 | 98 | 20 | 105 |
| 1 | M | 100 | 1981 | 1783 | 90 | 100 | 260 |
| 2 | | 95 | 1949 | 1734 | 89 | 98 | 230 |
| 3 | | 90 | 1902 | 1806 | 95 | 95 | 200 |
| 4 | | 50 | 1882 | 1825 | 97 | 40 | 110 |
| 5 | | 30 | 1245 | 1221 | 98 | 20 | 105 |
| 1 | N | 100 | 1939 | 1764 | 91 | 100 | 260 |
| 2 | | 95 | 1920 | 1708 | 89 | 98 | 230 |
| 3 | | 90 | 1905 | 1809 | 95 | 95 | 200 |
| 4 | | 50 | 1874 | 1717 | 97 | 40 | 110 |
| 5 | | 30 | 1264 | 1239 | 98 | 20 | 105 |
| 1 | O | 100 | 1945 | 1751 | 90 | 100 | 260 |
| 2 | | 95 | 1922 | 1710 | 89 | 98 | 230 |
| 3 | | 90 | 1911 | 1815 | 95 | 95 | 200 |

TABLE 2-continued

| Negative electrode material | | Carging load of composite particle (%) | Initial Discharge Capacity (mAh) | 100th Discharge Capacity (mAh) | capacity retention rate (%) | Lithium content of phase A (atomic %) | Negative electrode expansion (%) |
|---|---|---|---|---|---|---|---|
| 4 | | 50 | 1885 | 1828 | 97 | 40 | 110 |
| 5 | | 30 | 1234 | 1211 | 98 | 20 | 105 |
| 1 | P | 100 | 1901 | 1692 | 89 | 100 | 260 |
| 2 | | 95 | 1882 | 1674 | 89 | 98 | 230 |
| 3 | | 90 | 1878 | 1802 | 96 | 95 | 200 |
| 4 | | 50 | 1860 | 1805 | 97 | 40 | 110 |
| 5 | | 30 | 1226 | 1202 | 98 | 20 | 105 |
| 1 | Q | 100 | 1910 | 1719 | 90 | 100 | 260 |
| 2 | | 95 | 1901 | 1708 | 89 | 98 | 230 |
| 3 | | 90 | 1894 | 1800 | 95 | 95 | 200 |
| 4 | | 50 | 1858 | 1803 | 97 | 40 | 110 |
| 5 | | 30 | 1223 | 1199 | 98 | 20 | 105 |
| 1 | R | 100 | 1949 | 1754 | 90 | 100 | 260 |
| 2 | | 95 | 1922 | 1749 | 89 | 98 | 230 |
| 3 | | 90 | 1894 | 1800 | 95 | 95 | 200 |
| 4 | | 50 | 1860 | 1805 | 97 | 40 | 110 |
| 5 | | 30 | 1216 | 1192 | 98 | 20 | 105 |
| 1 | S | 100 | 1909 | 1697 | 89 | 100 | 260 |
| 2 | | 95 | 1897 | 1689 | 89 | 98 | 230 |
| 3 | | 90 | 1885 | 1809 | 95 | 95 | 200 |
| 4 | | 50 | 1856 | 1801 | 97 | 40 | 110 |
| 5 | | 30 | 1222 | 1198 | 98 | 20 | 105 |
| Graphite | | — | 1510 | 1389 | 92 | | 110 |

TABLE 3

| | Negative electrode material | Current density (mA/cm$^2$) | Initial Discharge Capacity (mAh) | 100th Discharge Capacity (mAh) | capacity retention rate (%) |
|---|---|---|---|---|---|
| 1 | Material A | 1 | 1870 | 1495 | 78 |
| 2 | | 3 | 1868 | 1401 | 75 |
| 3 | | 5 | 1860 | 1302 | 70 |
| 4 | | 7 | 1859 | 1153 | 62 |
| 5 | B | 1 | 1864 | 1491 | 80 |
| 6 | | 3 | 1862 | 1490 | 80 |
| 7 | | 5 | 1859 | 1394 | 75 |
| 8 | | 7 | 1855 | 1168 | 63 |
| 9 | C | 1 | 1847 | 1422 | 77 |
| 10 | | 3 | 1842 | 1400 | 76 |
| 11 | | 5 | 1838 | 1342 | 73 |
| 12 | | 7 | 1830 | 1116 | 61 |
| 13 | D | 1 | 1852 | 1482 | 80 |
| 14 | | 3 | 1849 | 1442 | 78 |
| 15 | | 5 | 1846 | 1403 | 76 |
| 16 | | 7 | 1841 | 1178 | 64 |
| 17 | E | 1 | 1876 | 1520 | 81 |
| 18 | | 3 | 1873 | 1498 | 80 |
| 19 | | 5 | 1869 | 1458 | 78 |
| 20 | | 7 | 1862 | 1210 | 65 |
| 21 | F | 1 | 1863 | 1453 | 78 |
| 22 | | 3 | 1861 | 1377 | 74 |
| 23 | | 5 | 1861 | 1302 | 70 |
| 24 | | 7 | 1859 | 1153 | 62 |
| 25 | G | 1 | 1871 | 1553 | 83 |
| 26 | | 3 | 1868 | 1494 | 80 |
| 27 | | 5 | 1866 | 1418 | 76 |
| 28 | | 7 | 1864 | 1212 | 65 |
| 29 | H | 1 | 1956 | 1584 | 81 |
| 30 | | 3 | 1955 | 1525 | 78 |
| 31 | | 5 | 1951 | 1483 | 76 |
| 32 | | 7 | 1948 | 1227 | 63 |
| 33 | I | 1 | 1940 | 1582 | 80 |
| 34 | | 3 | 1938 | 1550 | 80 |
| 35 | | 5 | 1936 | 1491 | 77 |
| 36 | | 7 | 1930 | 1177 | 61 |
| 37 | J | 1 | 1974 | 1559 | 79 |
| 38 | | 3 | 1973 | 1539 | 78 |
| 39 | | 5 | 1971 | 1518 | 77 |
| 40 | | 7 | 1969 | 1260 | 64 |
| 41 | K | 1 | 1969 | 156 | 79 |
| 42 | | 3 | 1965 | 1493 | 76 |
| 43 | | 5 | 1965 | 1454 | 74 |
| 44 | | 7 | 1960 | 1176 | 60 |
| 45 | L | 1 | 1989 | 1651 | 83 |
| 46 | | 3 | 1983 | 1606 | 81 |
| 47 | | 5 | 1983 | 1547 | 78 |
| 48 | | 7 | 1976 | 1284 | 65 |
| 49 | M | 1 | 1981 | 1624 | 82 |
| 50 | | 3 | 1981 | 1605 | 81 |
| 51 | | 5 | 1976 | 1462 | 74 |
| 52 | | 7 | 1973 | 1223 | 62 |
| 53 | N | 1 | 1939 | 1532 | 79 |
| 54 | | 3 | 1935 | 1471 | 76 |
| 55 | | 5 | 1933 | 1411 | 73 |
| 56 | | 7 | 1929 | 1138 | 59 |
| 57 | O | 1 | 1945 | 1537 | 79 |
| 58 | | 3 | 1945 | 1498 | 77 |
| 59 | | 5 | 1940 | 1416 | 73 |
| 60 | | 7 | 1935 | 1180 | 61 |
| 61 | P | 1 | 1901 | 1445 | 76 |
| 62 | | 3 | 1898 | 1386 | 73 |
| 63 | | 5 | 1895 | 1345 | 71 |
| 64 | | 7 | 1890 | 1096 | 58 |
| 65 | Q | 1 | 1920 | 1536 | 80 |
| 66 | | 3 | 1918 | 1496 | 78 |
| 67 | | 5 | 1915 | 1417 | 74 |
| 68 | | 7 | 1909 | 1241 | 65 |
| 69 | R | 1 | 1949 | 1579 | 81 |
| 70 | | 3 | 1948 | 1539 | 79 |
| 71 | | 5 | 1946 | 1421 | 73 |
| 72 | | 7 | 1941 | 1165 | 60 |
| 73 | S | 1 | 1907 | 1468 | 77 |

TABLE 3-continued

| Negative electrode material | Current density (mA/cm²) | Initial Discharge Capacity (mAh) | 100th Discharge Capacity (mAh) | capacity retention rate (%) |
|---|---|---|---|---|
| 74 | 3 | 1903 | 1408 | 74 |
| 75 | 5 | 1901 | 1350 | 71 |
| 76 | 7 | 1899 | 1082 | 57 |

What is claimed is:

1. A non-aqueous electrolyte secondary battery comprising:
   a positive electrode,
   a negative electrode capable of intercalating and de-intercalating lithium,
   a non-aqueous electrolyte solution, and
   a separator or a solid electrolyte,
   wherein:
      said negative electrode comprises a plurality of composite particles,
      each of said composite particles comprises a central portion comprising lithium and at least one element selected from the group consisting of tin, silicon and zinc; and a coating at least partially around said central portion,
      said coating comprising solid solution or an inter-metallic compound,
      said solid solution or inter-metallic compound comprising a) said at least one element selected from the group consisting of tin, silicon and zinc, and b) at least one element selected from the group consisting of group 2 elements, transition elements, group 12 elements, group 13 elements and group 14 elements exclusive of carbon, and exclusive of said at least element selected from the group consisting of tin, silicon, and zinc;
      wherein the lithium content of said central portion is 40–95 atomic percent of the theoretical lithium content limit of the central portion.

2. The non-aqueous electrolyte secondary battery of claim 1, wherein the lithium content of said central portion is 50–90 atomic percent of the theoretical lithium content limit of the central portion.

3. A non-aqueous electrolyte secondary battery comprising:
   a positive electrode,
   a negative electrode capable of intercalating and de-intercalating lithium, said negative electrode comprising a current collector,
   a non-aqueous electrolyte solution, and
   a separator or a solid electrolyte,
   wherein:
      said negative electrode comprises a plurality of composite particles,
      each of said composite particles comprises a central portion comprising lithium and at least one element selected from the group consisting of tin, silicon and zinc; and a coating at least partially around said central portion,
      said coating comprising a solid solution or an inter-metallic compound;
      said solid solution or inter-metallic compound comprising a) said at least one element selected from the group consisting of tin, silicon and zinc, and b) at least one element selected from the group consisting of group 2 elements, transition elements, group 12 elements, group 13 elements and group 14 elements exclusive of carbon, and exclusive of said at least element selected from the group consisting of tin, silicon, and zinc;
      wherein the volume expansion of said negative electrode exclusive of the current collector is 110–200% when said negative electrode contains an amount of lithium which prevents deposit of lithium on said negative electrode.

4. A method charging of a non-aqueous electrolyte secondary battery, said method comprising the steps of:
   providing said battery, said battery comprising a positive electrode and a negative electrode;
   wherein
      the negative electrode comprises a plurality of composite particles each of said composite particle comprises a central portion comprising lithium and at least one element selected from the group consisting of tin, silicon and zinc; and a coating at least partially around said central portion,
      said coating comprising a solid solution or an inter-metallic compound,
      said solid solution or inter-metallic compound a) said at least one element selected from the group consisting of tin, silicon and zinc, and b) at least one element selected from the group consisting of group 2 elements, transition elements, group 12 elements, group 13 elements and group 14 elements exclusive of carbon, and exclusive of said at least element selected from the group consisting of tin, silicon, and zinc;
   charging said battery at a constant current until reaching a predetermined voltage, and
   charging said battery at said predetermined voltage after reaching said predetermined voltage, said predetermined voltage producing a current;
   wherein said constant current and said current produced by said predetermined voltage are at not more than 5 mA/cm2 current density at an area where said positive electrode and said negative electrodes face each other.

5. A non-aqueous electrolyte secondary battery comprising;
   a positive electrode,
   a negative electrode capable of intercalating and de-intercalating lithium,
   a non-aqueous electrolyte solution, and
   either a separator or a solid electrolyte;
   wherein:
      the negative electrode comprises a plurality of composite particles;
      each of said composite particles comprise a nuclear particle consisting essentially of lithium and an element selected from the group consisting of tin, silicon, and zinc;
      at least a part of a surface of each of the nuclear particles is coated with either a solid solution or an inter-metallic compound;
      said solid solution or intermetallic compound comprises said element selected from the group consisting of tin, silicon, and zinc and at least one additional element;
      said additional is selected from the group consisting of group 2 elements, transition elements, group 12 elements, group 13 elements, and group 14 elements exclusive of carbon, and exclusive of said element selected from the group consisting of tin, silicon, and zinc, and the lithium content of said central portion is 40–95 atomic percent of the theoretical lithium content limit of the central portion.

6. The non-aqueous electrolyte secondary battery of claim 5, wherein the element selected from the group consisting of tin, silicon, and zinc is tin.

7. The non-aqueous electrolyte secondary battery of claim 5, wherein the element selected from the group consisting of tin, silicon, and zinc is silicon.

8. The non-aqueous electrolyte secondary battery of claim 5, wherein the element selected from the group consisting of tin, silicon, and zinc is zinc.

9. The non-aqueous electrolyte secondary battery of claim 5, wherein the additional element is selected from the group consisting of Mg, Fe, Mo, Zn, Cd, In, Pb, Co, Ni, Al, Sn, Cu, V, and Ge.

10. The non-aqueous electrolyte secondary battery of claim 5, wherein the lithium content of said central portion is 50–90 atomic percent of the theoretical lithium content limit of the central portion.

11. The non-aqueous electrolyte secondary battery of claim 3, wherein the element selected from the group consisting of tin, silicon, and zinc is tin.

12. The non-aqueous electrolyte secondary battery of claim 3, wherein the element selected from the group consisting of tin, silicon, and zinc is silicon.

13. The non-aqueous electrolyte secondary battery of claim 3, wherein the element selected from the group consisting of tin, silicon, and zinc is zinc.

14. The method of claim 4, wherein the element selected from the group consisting of tin, silicon, and zinc is tin.

15. The method of claim 4, wherein the element selected from the group consisting of tin, silicon, and zinc is silicon.

16. The method of claim 4, wherein the element selected from the group consisting of tin, silicon, and zinc is zinc.

17. A method charging of a non-aqueous electrolyte secondary battery, said method comprising the steps of:

providing said battery, said battery comprising a positive electrode and a negative electrode;

wherein the negative electrode comprises a plurality of composite particles each of said composite particle comprises a central portion consisting essentially of lithium and at least one element selected from the group consisting of tin, silicon and zinc; and a coating at least partially around said central portion, said coating comprising a solid solution or an inter-metallic compound, said solid solution or inter-metallic compound a) said at least one element selected from the group consisting of tin, silicon and zinc, and b) at least one element selected from the group consisting of group 2 elements, transition elements, group 12 elements, group 13 elements and group 14 elements exclusive of carbon, and exclusive of said at least element selected from the group consisting of tin, silicon, and zinc;

charging said battery at a constant current until reaching a predetermined voltage, and charging said battery at said predetermined voltage after reaching said predetermined voltage said predetermined voltage producing a current;

wherein said constant current and said current produced by said predetermined voltage are at not more than 5 mA/cm2 current density at an area where said positive electrode and said negative electrodes face each other.

18. The method of claim 17, wherein the element selected from the group consisting of tin, silicon, and zinc is tin.

19. The method of claim 17, wherein the element selected from the group consisting of tin, silicon, and zinc is silicon.

20. The method of claim 17, wherein the element selected from the group consisting of tin, silicon, and zinc is zinc.

* * * * *